United States Patent

Mirring

[11] Patent Number: 5,897,215
[45] Date of Patent: Apr. 27, 1999

[54] RADIAL ROLLER BEARING ASSEMBLY

[75] Inventor: Knut Mirring, Gochsheim, Germany

[73] Assignee: SKF GmbH, Germany

[21] Appl. No.: 08/969,012

[22] Filed: Nov. 10, 1997

[30] Foreign Application Priority Data

Sep. 11, 1996 [DE] Germany .............................. 19646310

[51] Int. Cl.⁶ ...................................................... F16C 33/46
[52] U.S. Cl. ............................................ 384/564; 384/572
[58] Field of Search ..................................... 384/564, 572, 384/576, 580, 575

[56] References Cited

U.S. PATENT DOCUMENTS 2,977,164  3/1961  Witte .

FOREIGN PATENT DOCUMENTS 2 136 364  7/1971  Germany .
39 02 194 A1  1/1989  Germany .

Primary Examiner—Lenard A. Footland
Attorney, Agent, or Firm—Eugene E. Renz, Jr., PC

[57] ABSTRACT

The present invention relates to a radial roller bearing assemblies. More specifically, the invention relates to radial roller bearing assemblies including an outer ring having radially inwardly directed stop flanges, a cage comprising a pair of side rings and webs connecting the side rings, circumferentially spaced to define pockets for rolling elements, each of the side rings having radially projecting segments located at diametrically opposed locations wherein the distance (Dc) between the highest point on the segmental projection of one of the cage side rings and the diametrically opposite point of the same cage side ring is in a predetermined relation to the diameter (Dk) of the bore of the stop flange so that when the axial centers of the cage and ring are coincident, the segmental projections confront the inner radial faces of the stop flanges.

3 Claims, 3 Drawing Sheets

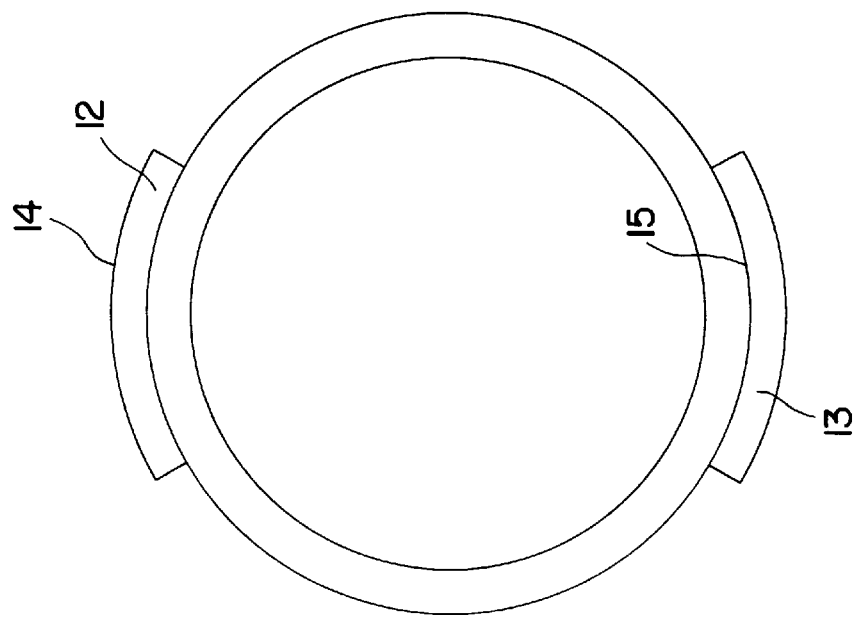
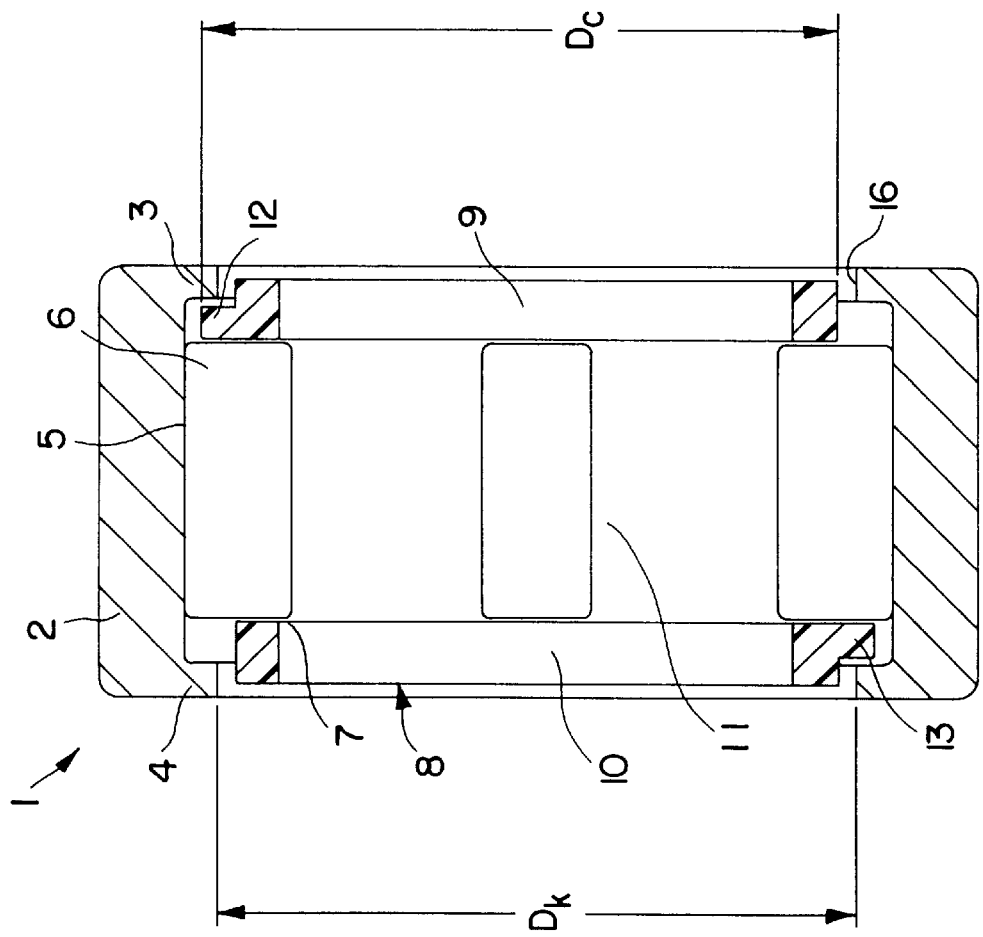

RADIAL ROLLER BEARING ASSEMBLY

FIELD OF THE INVENTION

The present invention relates to improvements in radial roller bearing assemblies the type wherein the outer ring is provided at both ends with radially, inwardly stop flanges for the pocket cage and wherein the cage is formed by side rings and webs connecting the rings which are circumferentially spaced to define pockets for the rolling elements.

BACKGROUND OF THE INVENTION

In radial roller bearing assemblies of the type described above, the outer ring frequently is designed as a thin-walled sleeve with flanges at both axial ends for the axial retention of the cage. In order to facilitate assembly of the rollers, the sleeve is first prefabricated with only one flange so that the cage into which the roller elements have been inserted may be pushed onto the sleeve from the side without a flange. In the final assembly step, the opposing second flange is formed on the sleeved by a rolling process. It has been found that this subsequent shaping process required to form the second flange raises the cost of producing bearing assemblies in this fashion considerably. Additionally, radial roller bearings of this type cannot usually be disassembled without destroying them.

There have been proposed solutions to the problem discussed above. For example, German Patent DE-OS 3,902, 194, discloses that either one or both side flanges of the outer ring can be provided with an opening eccentric to the bearing axis or the cage can be provided with side rings arranged eccentrically to the bearing axis and in this way the cage can be introduced axially into the bearing ring in a position different from that of this final installation to avoid the extra step of shaping the second flange and making it possible for the bearing to be disassembled without destroying it. However, these designs have certain drawbacks and disadvantages. For example, in these assemblies, the cage is fixed in place in the two axial directions only at one point around the circumference. Furthermore, the eccentric opening of one or both side flanges increases the cost of fabrication considerably.

Cylindrical roller bearings with comb-type cages with separating webs which engage between the rollers are also known (U.S. Pat. No. 2,977,164). Tabs and the like which project radially outwardly over the side ring of the cage, are provided on the lateral surfaces of the webs to engage behind a side flange of the outer ring of the bearing. When these cages are introduced into the flanges bearing rings, the tabs or webs are deformed under pressure. These designs mean that the material out of which the cage is made must be relatively soft.

So that significantly harder materials can be used, a comb-type cage of this type is known (GB 1 380 454) in which tabs or the like projecting radially out over the cage side ring are provided on only some of the separating webs, that is, at only two diametrically opposing points on the cage. As a result, it is possible to tip the cage as it is being introduced into the outer ring around an axis perpendicular to the diametrical axis of the webs and their projections and then to right it again side the raceway. Such comb cages are not universally applicable.

SUMMARY OF THE INVENTION

With the foregoing in mind, it is an object of the present invention to provide an improved radial roller bearing assembly characterized by novel features of construction and arrangement which can be produced economically and which can be assembled easily and disassembled without destruction and which overcomes the disadvantages of the prior art assemblies discussed above.

To this end, in accordance with the present invention, the outer ring is provided at both axial ends with radially, inwardly directed stop flanges for the pocket cage which comprises a pair of spaced annular side rings and a plurality of circumferentially spaced webs connecting the side rings defining a plurality of pockets for the rolling elements wherein the concentric side rings are provided with a radial projection at two points diametrically opposed each other on their circumference. These projections extend around a portion of the circumference and are designed to engage behind the stop flanges of the outer ring. The height of the projections is preferably selected so that the distance ($D_c$) from the highest point of the projection of one of the cage side rings to the diametrically opposed opposite point on the same cage side ring is equal to or slightly less than the diameter ($D_K$) of the bore of the stop flange.

By this construction, it is possible to shift the cage eccentrically and then to move it in the axial direction into the outer ring over the side flange and the feed or snap in the rolling elements radially from the inside into the pockets of the cage. Alternatively, it is also possible to tilt the cage slightly before introducing it into the outer ring with its side flanges and then to right it so that the rolling elements can be fed or snapped radially from the inside into the cage pockets.

Accordingly, in comparison to conventional bearings of the type disclosed under the prior art section, the outer ring of the radial roller bearing assembly according to the present invention does not have to be changed in any material way. For example, no openings are necessary in the side flanges which, under certain conditions, could cause the outer ring to warp or to undergo other forms of distortion during hardening or lead to the necessity of additional work and thus increase the cost of production. Further, the cage itself can be made of a relatively hard material and the side rings can be provided with sufficiently sturdy projections which do not have to be deformed as the cage is being assembled or introduced into the outer ring.

BRIEF DESCRIPTION OF THE DRAWINGS

These and other objects of the present invention and various features and details of the operation and construction thereof are hereinafter more fully set forth with reference to the accompanying drawings, wherein:

FIG. 1 is a longitudinal cross section through a radial cylindrical roller bearing assembly in accordance with the present invention;

FIG. 2 is a side view of the cage of the radial cylindrical roller bearing as illustrated in FIG. 1;

DETAILED DESCRIPTION OF THE PREFERRED EMBODIMENT

Figure 3:
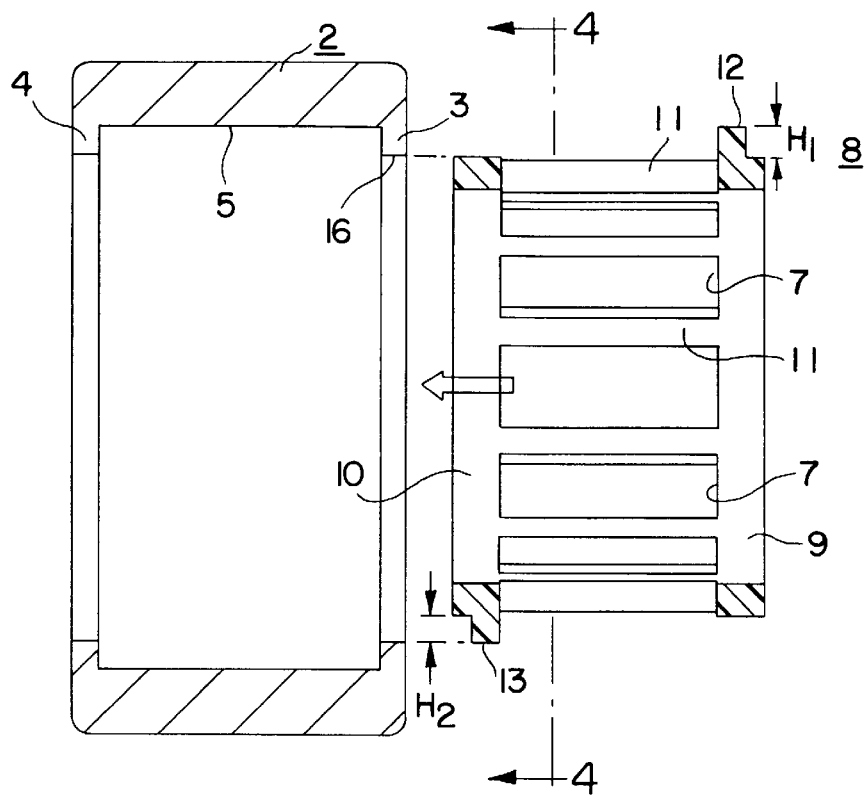
FIG. 3 is an exploded sectional view showing the cage eccentrically positioned with respect to the outer ring prior to insertion of the cage within the outer ring.

Referring now to the drawings and particularly FIG. 1 thereof, there is shown a radial cylindrical roller bearing assembly generally designated by the numeral (1) having an outer ring (2) and a pair of radially inwardly directed stop flanges (3) and (4) at opposite axial ends of the outer ring (2). A plurality of cylindrical rollers (6) are distributed around the circumference of the outer ring (2) and are guided in pockets (7) of the cage (8) in the circumferential direction. The cage pockets (7) retain the rolling elements from displacement radially inwardly and maintain them in rolling contact on the cylindrical raceway (5) of the outer ring (2).

Figure 4:
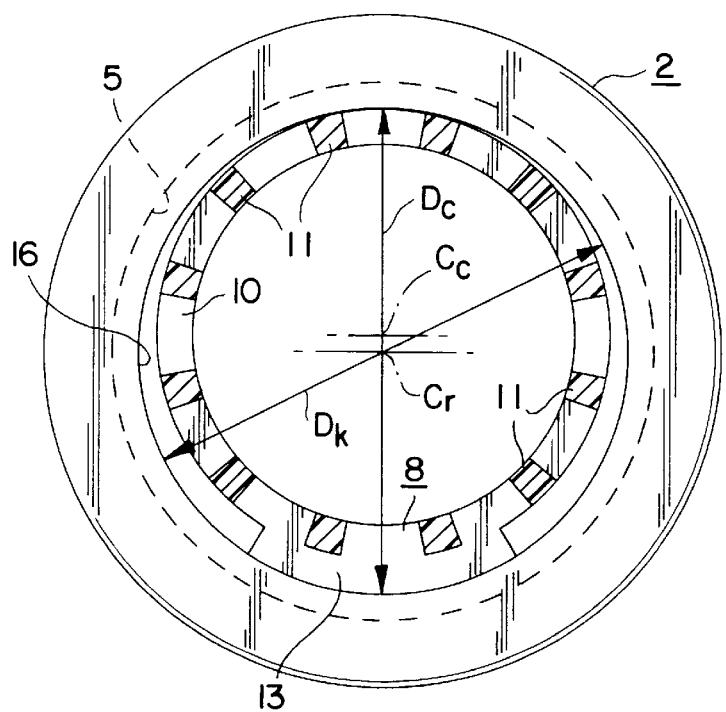
FIG. 4 is a sectional view taken on the line 4, 4 of FIG. 3 showing the cage eccentrically positioned for insertion within the bore of the outer ring.
Figure 5:
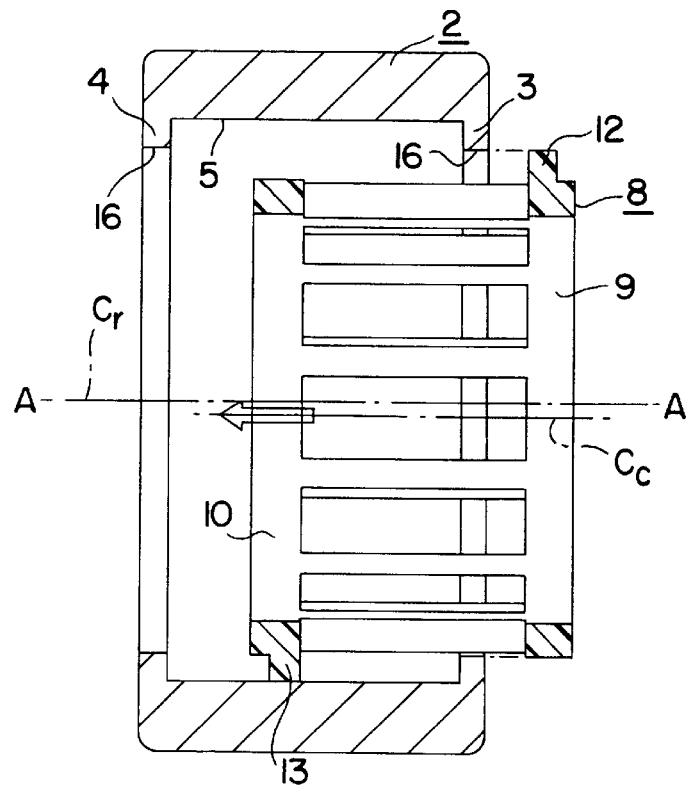
FIG. 5 is a sectional view similar to FIG. 3, but showing the cage having been repositioned eccentrically with respect to the outer ring centerline in order to complete the cage insertion within the outer ring.
Figure 6:
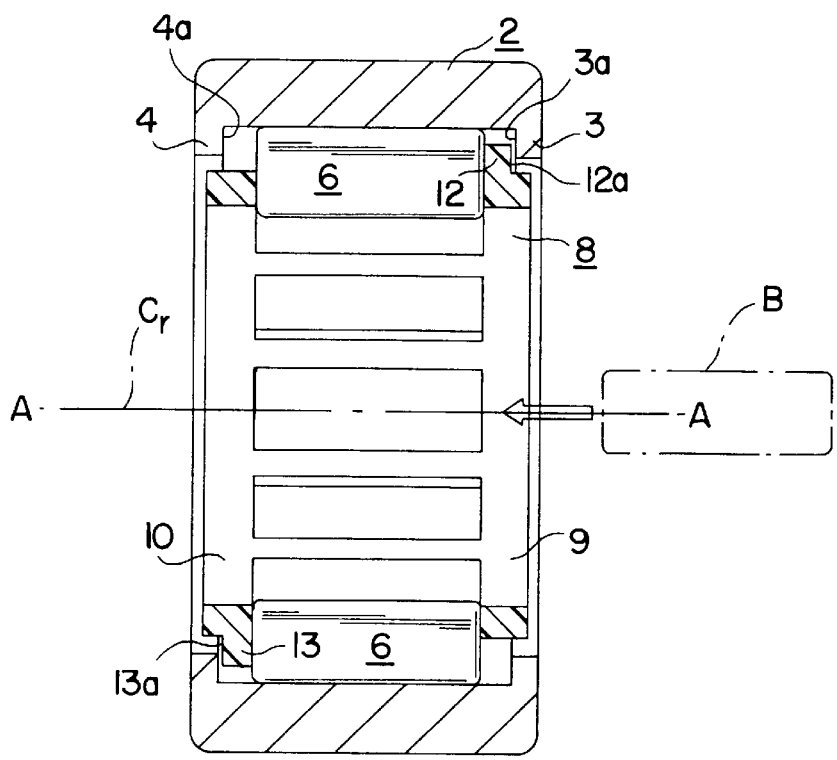
FIG. 6 is a sectional view showing the cage symmetrically positioned and retained within the outer ring by the insertion of roller bearings into the pockets of the cage.

The cage (8) comprises a pair of annular side rings (9) and (10) which are concentric to the bearing axis (A—A) and a plurality of webs (11) which connect the side rings (9) and (10) and are circumferentially equi-spaced so that they are situated between adjacent cylindrical rollers (6) and form pockets P for the rolling elements. The side ring (9) has an arcuate radially outwardly directed segmental projection (12) which extends over a predetermined portion of the outer circumference of the side ring (9) and which in the installed state engages behind stop flange (3) to hold cage (8) with its cylindrical rollers (6) in place in the axial direction. The side ring (10) has an arcuate radially outwardly directed segmental projection (13) which extends over a predetermined portion of the outer circumference of the side ring (10) and which in the installed state engages behind stop flange 4 to hold the cage (8) and rollers (6) in the axial direction. The arcuate segments (12) and (13) are preferably diametrically opposed and preferably have an outer arcuate contour complementing the arcuate shape of the bore 16 of the flanges (3) and (4) (see FIG. 4).

By this arrangement, the radial faces ($12_a$) and ($13_a$) confront the inner circumferential surfaces ($3a$) and ($4a$) when the axial center (Cc) of the cage is coincident with the axial center ($C_r$) of the outer ring (2) (See FIG. 1). Note that with these relationships, there is clearance between the elements of the cage such as segments (12) and (13) and the outer raceway (5).

The heights ($H_1$) and ($H_2$) of projections (12) and (13) respectively are designed so that the distance ($D_c$) from the highest point (14) on projection (12) on side ring (9) of the cage to the diametrically opposite point (15) on cage side ring (9) is equal to or less than diameter ($D_k$) of cylindrical bore (16) concentric to the bearing axis (A—A) of stop flange (3).

By this construction, it is possible to insert the cage through bore (16) of stop flange (3) by first moving side ring (10) of cage (8) eccentrically upwardly and next by moving the second side ring (9) eccentrically downwardly which permits the second ring to be inserted through stop flange (3). Cylindrical rollers (6) can then be inserted radially from the inside into pockets (7) of cage (8).

In accordance with alternative method, it is possible to tip cage (8) slightly and then to insert it through stop flange (3) into outer ring (2). After cage (8) has been properly aligned, cylindrical rollers (6) can be snapped into pockets (7) of cage (8) radially from the inside.

Even though a particular embodiment of the invention has been illustrated and described herein, it is not intended to limit the invention and changes and modifications may be made therein within the scope of the following claims.

What is claimed is:

1. In a radial roller bearing assembly in which the outer ring is provided on both ends with radially inwardly directed stop flanges for the pocket cage, in the pockets of which the rolling elements are seated, the cage being formed out of side rings and the webs connecting them to each other, characterized in that each of the concentric side rings of the cage is provided at diametrically opposite points on the circumference with radial projections extending over a portion of the circumference, which engage behind the stop flanges of the outer ring, the flanges being designed with a concentric bore.

2. In a radial roller bearings assembly according to claim 1, characterized in that the distance (Dc) between the highest point on the segmental projection of one of the cage side rings and the diametrically opposite point of the same cage side ring is equal to or slightly less than the diameter (Dk) of the bore of the stop flange.

3. In a radial roller bearing assembly including an outer ring having radially inwardly directed stop flanges, a cage comprising a pair of side rings and webs connecting the side the rings, circumferentially spaced to define pockets for rolling elements, each of the side rings having radially projecting segments located at diametrically opposed locations wherein the distance (Dc) between the highest point on the segmental projection of one of the cage side rings and the diametrically opposite point of the same cage side ring is in a predetermined relation to the diameter (Dk) of the bore of the stop flange so that when the axial centers of the cage and ring are coincident, the segmental projections confront the inner radial faces of the stop flanges.

* * * * *

UNITED STATES PATENT AND TRADEMARK OFFICE
CERTIFICATE OF CORRECTION

PATENT NO. : 5,897,215
DATED : April 27, 1999
INVENTOR(S) : Knut Mirring

It is certified that error appears in the above-identified patent and that said Letters Patent is hereby corrected as shown below:

On the title page, item

[30] Foreign Application Priority Data is incorrect. The priority date listed on the patent "Sep. 11, 1996" should be --November 9, 1996--.

Signed and Sealed this

Thirty-first Day of August, 1999

Attest:

Q. TODD DICKINSON

*Attesting Officer*         *Acting Commissioner of Patents and Trademarks*